Patented Dec. 4, 1945

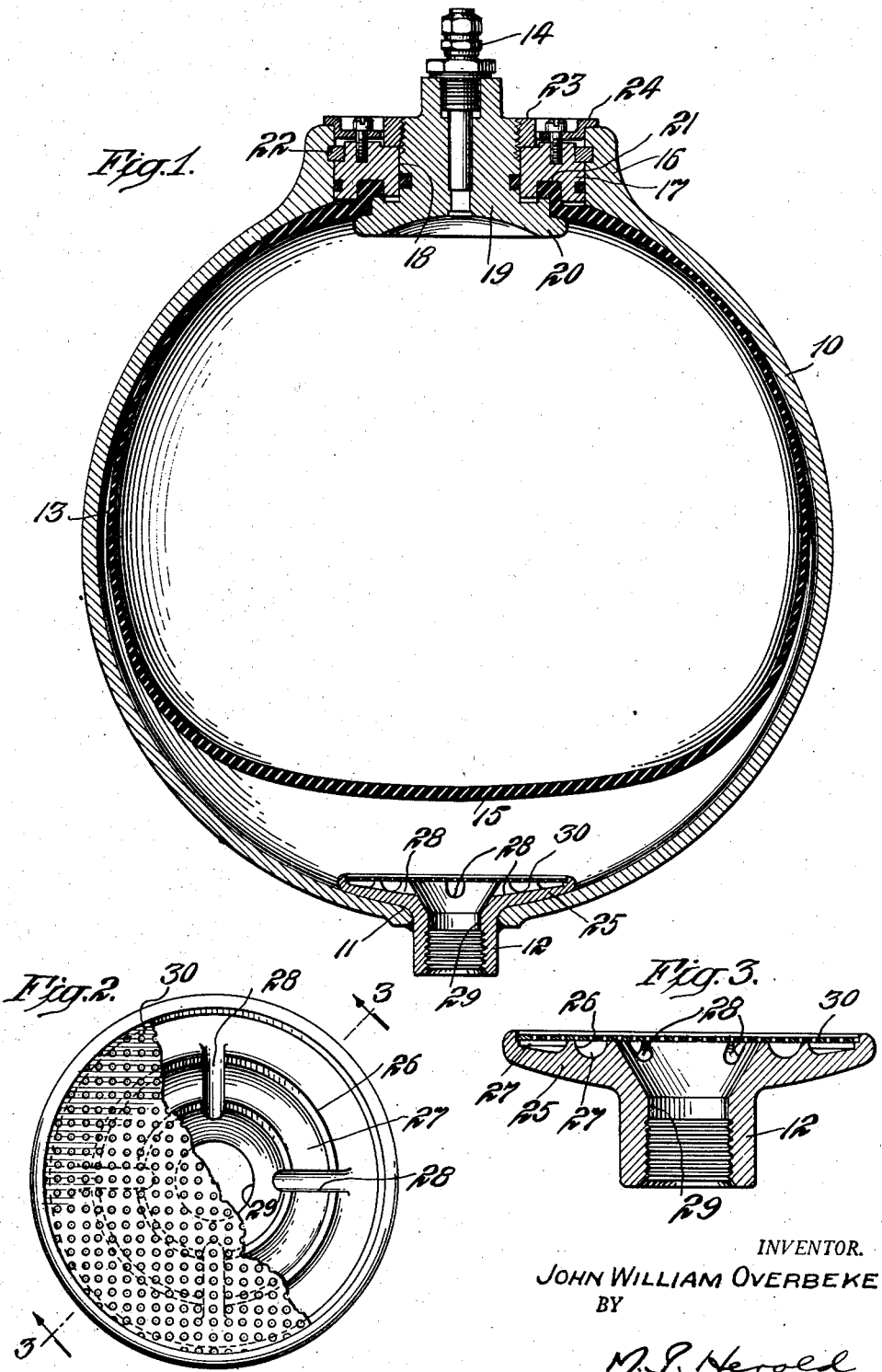

2,390,320

UNITED STATES PATENT OFFICE 2,390,320

PRESSURE VESSEL

John William Overbeke, New York, N. Y., assignor to Simmonds Aerocessories, Inc. of New York, New York, N. Y., a corporation of New York Application December 28, 1943, Serial No. 515,934

6 Claims. (Cl. 138—30)

This invention relates to pressure jars or vessels such as accumulators and surge relievers wherein a fluid is stored or pumped under pressure, and more particularly to such vessels having a novel fluid passing plug as a component part.

General objects of the invention are to provide pressure vessels of the mentioned types having improved means for passing fluid in and out of their pressure shells.

Particular objects of this invention are to provide pressure accumulators, wherein the membrane may be subjected to high initial air pressures, which are equipped with an improved fluid passing port having a perforate plate of adequate area equipped with novel supporting means.

Another object of the invention is to provide an improved fluid passing plug having features of construction enabling it to be used to advantage in a high pressure fluid system.

Other objects of the invention will in part be obvious and will in part appear hereinafter.

The invention accordingly comprises the features of construction, combination of elements, and arrangement of parts, which will be exemplified in the construction hereinafter set forth, and the scope of which invention will be indicated in the claims.

For a fuller understanding of the nature and objects of the invention reference should be had to the following detailed description taken in connection with the accompanying drawing, in which:

Fig. 1 is a vertical sectional view through a pressure accumulator, showing the improved fluid passage of the present invention in one of its applications;

Fig. 2 is a plan view, on an enlarged scale, of a fluid passing plug embodying features of the invention, part thereof being broken away; and Fig. 3 is a vertical sectional view along line 3—3 of Fig. 2.

In the pressure accumulator type of vessel, as used on aircraft and elsewhere, there is usually a strong pressure shell having an internally disposed membrane separating the shell into an air and a liquid compartment. The hydraulic service line is connected with the liquid compartment, and air under pressure is forced into and trapped in the air compartment. The initial compression in the air compartment may be quite high, on the order of 600 p. s. i. when the membrane is fully expanded and there is little or no liquid in the shell. Such pressure forces the membrane (if the hydraulic line pressure is low) against the liquid port with a force tending to extrude and harmfully pinch it, especially when the membrane is made of rather soft gummy stock as is wanted for some services. Accordingly it is desirable to cover the liquid port with a perforate wall or plate having individually small orifices through which the membrane will not extrude. In order to cope with required fluid passing capacities, however, the aggregate number of such orifices should be such as to require a plate of extensive area, which under the high pressures employed in accumulators, is subject to heavy bending strain.

One illustrative embodiment of an accumulator having a liquid passing plug with an orificed plate of sufficiently extensive area to assure ready passage of fluid in and out of the service line and which at the same time is held against bending or crushing under membrane pressure is shown in the drawing, wherein 10 is steel accumulator shell of any suitable shape and type, being in this instance illustrated as of seamless spherical form. At one end the shell has a liquid passing opening 11, into which is fitted an oil plug 12, the features of which characterize the present invention.

Within the shell is an air containing membrane 13, of rubber or rubber-like compound adapted to be loaded through a check valve 14 with air under a high initial pressure so that the bottom of the bag-like membrane at 15 is forced against the oil plug 12 when there is no oil under pressure within the accumulator shell. If desired such lower portion 15 of the membrane may be thickened or equipped with a protective added ply (not shown) to help prevent extrusion of the membrane stock outwardly through the plug orifices.

At the other end of the shell from the plug 12, is a wide mouth permitting entry of the plug 12 within the shell. Such mouth and closure means including means for clamping and sealing the membrane in position are more fully described and specifically claimed in my copending application Serial No. 515,933, filed December 28, 1943, and features of such mouth, membrane and closure are generically claimed in my copending application, Serial No. 516,167, filed Dec. 30, 1943.

An accumulator similarly equipped with an oil plug having an enlarged head at one end and a wide mouthed opening at the other providing for assembly of such plug within the shell is shown and more broadly claimed in my copending application, Serial No. 515,932, filed Dec. 28, 1943.

As illustrated herein such a plug accommodating means comprises a thick walled mouth 16 which may be formed of hot spun metal accumulated during the shaping of the shell, within which is fitted a collar 17. These parts together form a neck having a central opening 18, within which is slidably fitted a stopper 19, having an air passage therethrough within which a check valve 14 is fitted. The stopper 19 has a flange 20 at its lower end opposing an inwardly directed surface 21 on the collar. The edge of the membrane is clamped between flange 20 and collar surface 21, and is held under sealing pressures responsive to pressure within the accumulator shell, the stopper 19 being outwardly slidable in the collar opening 18. A segmented locking ring 22 is adapted to have its several parts fitted in an annular groove in the mouth 16, above the collar 17, to hold the latter against outward movement. A locknut 23 is threaded to the outer end of the stopper 19 and holds it against inward movement with respect to collar 17, and a holding ring 24 is pinned to the collar to hold it against inward movement with respect to the shell mouth.

Referring again to the oil plug 12, such member has an enlarged head 25 capable of being passed through the mouth 16 and adapted to rest against the interior shell walls adjacent the aperture 11. The plug may be welded, brazed, or otherwise suitably fastened in this position.

The enlarged plug head carries a number of concentric supporting ribs 26, between which are disposed concentric oil passing channels 27. Such concentric channels are connected by radial channels 28, which interrupt the ribs 26 and lead to a central passage 29 through the plug body and head. The outer end of such passage may be suitably threaded as shown, or otherwise prepared for connection with the hydraulic system tubing.

A plate 30, containing a number of fluid passing orifices, is placed on and supported by the ribs 26, in which position it may be silver soldered or otherwise suitably attached to the head 25. The plate orifices are made small enough to avoid undue extrusion of the rubber membrane stock therethrough and the plate is made as thin as is consistent with the mechanical strength requirement in a given installation, both because such stock has better orifice flow characteristics and because it is subject to more ready manufacture. Preferably the plate 30 is made of commercial perforate sheet metal stock of the kind used for filters or strainers and like purposes, which is economically available in many thicknesses and orifice arrangements. The aggregate number of orifices in the plate 30 is such that their liquid passing capacity under all service conditions at least equals and preferably well exceeds the liquid passing capacity of the passage 29 through the plug.

The arrangement of the supporting ribs and channels beneath the plate need not be concentric and radial as described above but may take any suitable configuration capable of holding the plate 30 against bending movement imposed by the membrane, while affording communication from the plate orifices to the central plug passage 29. Such ribs for example could take the form of isolated posts or columns. Also while mounting of the plate and its supporting ribs on a plug capable of assembly as a unit with the shell is desirable and preferred, some advantages of the invention may be obtained with supporting ribs or posts integral with the shell walls over which the plate 30 may be affixed, in which case a plug need not be employed, or if used, may be in the form of a simple pipe or tube fitting.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In a fluid pressure vessel having an opening, a fluid passing plug in said opening having a hollow body and an enlarged head seated against the interior wall of said vessel, a sheet metal plate on said head having a plurality of orifices communicating with said hollow body, and means backing up said plate against outward bending.

2. In a fluid pressure vessel having a shell and an internally disposed membrane separating said shell into two fluid pressure compartments, a fluid passing plug in a wall of one of said compartments having a central passage adapted to be connected with a pressure line, and an interiorly facing head subject to pressing contact with said membrane, said head having a sheet metal plate on its inner side having a plurality of uniformly distributed orifices communicating with said central passage, and means backing up said plate against outward movement but leaving free a number of orifices having an aggregate area at least equal to the sectional area of such pressure line.

3. A pressure accumulator comprising a shell having an interior membrane separating it into two fluid compartments, wherein said shell has an opening therethrough into one of said compartments, and a plug having a body portion fitted into said opening, said body portion having a fluid passage therethrough for connection with outlet tubing, said plug also having an enlarged hollow head seated against the interior walls of said shell adjacent said opening, said head having an interiorly facing wall of greater area than the sectional area of said tubing against which wall said membrane intermittently presses, and said wall having a plurality of fluid passing orifices aggregating at least the fluid passing area of said tubing and individually small enough to prevent extrusion of said membrane to a harmful degree, the interiorly facing wall on said head being in the form of a separate orifice bearing plate attached to the remainder of said plug.

4. A pressure accumulator comprising a shell having an air opening at one end and a liquid opening at the other, a flexible membrane in said shell separating said openings, a hollow plug fitted through said liquid opening and having an enlarged head seated against the interior wall of said shell, said head having a separate plate attached across its inner face spanning the hollow part of said plug and having a plurality of liquid passing orifices leading thereto.

5. A fluid passing plug for use in a pressure vessel of the kind described, including a head having a fluid passage adapted to communicate with a supply tube on one side of said head, and having a supporting surface on its other side containing fluid channels depressed beneath said surface and communicating with said passage, and a sheet metal plate overlying and mating with said supporting surface and having a plurality of fluid passing orifices communicating with said channels.

6. In a pressure accumulator comprising a shell and a flexible membrane within said shell dividing it into fluid containing compartments, there being an opening in one compartment affording communication with an outlet tube, a thin flat sheet metal plate covering said opening and having a plurality of liquid passing orifices, and supporting means around said opening and between said plate and shell terminating in a common plane against which said flat plate is backed against outward bending under pressure from said membrane.

JOHN WILLIAM OVERBEKE.